US012671884B2

(12) United States Patent
Mao et al.

(10) Patent No.: US 12,671,884 B2
(45) Date of Patent: Jun. 30, 2026

(54) CAMERA DECORATION ASSEMBLY AND MOBILE TERMINAL DEVICE

(71) Applicant: Honor Device Co., Ltd., Shenzhen (CN)

(72) Inventors: Chuncheng Mao, Shenzhen (CN); Dong Ma, Shenzhen (CN); Kai Liu, Shenzhen (CN); Yan Lv, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 629 days.

(21) Appl. No.: 17/789,606

(22) PCT Filed: Jan. 17, 2022

(86) PCT No.: PCT/CN2022/072388
§ 371 (c)(1),
(2) Date: Apr. 12, 2024

(87) PCT Pub. No.: WO2022/262270
PCT Pub. Date: Dec. 22, 2022

(65) Prior Publication Data
US 2024/0388775 A1 Nov. 21, 2024

(30) Foreign Application Priority Data

Jun. 15, 2021 (CN) .......................... 202121329980.1

(51) Int. Cl.
*H04N 23/51* (2023.01)
*H04M 1/02* (2006.01)
(52) U.S. Cl.
CPC .......... *H04N 23/51* (2023.01); *H04M 1/0264* (2013.01); *H04M 1/0283* (2013.01); *H04M 2250/52* (2013.01)

(58) Field of Classification Search
CPC ........ H04N 23/50; H04N 23/51; H04N 23/52; H04N 23/54; H04N 23/55; H04N 23/57;
(Continued)

(56) References Cited

U.S. PATENT DOCUMENTS

2015/0366110 A1 12/2015 Park et al.

FOREIGN PATENT DOCUMENTS

CN 204377279 U 6/2015
CN 105120028 A 12/2015
(Continued)

*Primary Examiner* — Anthony J Daniels
(74) *Attorney, Agent, or Firm* — Conley Rose, P.C.

(57) ABSTRACT

This application provides a camera decoration assembly. The camera decoration assembly includes a decoration member, a mounting member and a fastener. The decoration member is exposed from a housing; and the decoration member and the mounting member are connected through the fastener or buckling, and are pressed on two opposite sides of the housing respectively. The mounting member includes a body and a conductor embedded in the body; and the conductor is of a metal structure, and is partially exposed from the body to be electrically connected to the decoration member and grounded. In the camera decoration assembly, the decoration member is mounted from outside of the housing, and the mounting member is mounted from inside of the housing, and is connected to the decoration member through the fastener or buckling. An appearance size of the decoration member located outside the housing is not limited by a size and a layout of an internal structure of a mobile terminal device. This application further provides a mobile terminal device including the camera decoration assembly.

20 Claims, 8 Drawing Sheets

300

(58) Field of Classification Search
      CPC .. G03B 30/00; H04M 1/0264; H04M 1/0383;
                                               H04M 2250/52
      USPC ........................................................ 348/374
      See application file for complete search history.

(56)                    References Cited

FOREIGN PATENT DOCUMENTS

| | | | | | |
|---|---|---|---|---|---|
| CN | 205901895 | U | | 1/2017 | |
| CN | 107018303 | A | * | 8/2017 | ............. H04N 23/57 |
| CN | 107454219 | A | * | 12/2017 | .......... H04M 1/0283 |
| CN | 107454222 | A | | 12/2017 | |
| CN | 107707796 | A | * | 2/2018 | ............. H04N 23/51 |
| CN | 108881681 | A | * | 11/2018 | ............. H04N 23/51 |
| CN | 107483668 | B | | 5/2019 | |
| CN | 110769136 | A | | 2/2020 | |
| CN | 110896419 | A | * | 3/2020 | ............. H04M 1/18 |
| CN | 107483799 | B | * | 5/2020 | .......... H04M 1/0264 |
| CN | 111586213 | A | * | 8/2020 | ............. H04N 23/57 |
| CN | 212696068 | U | | 3/2021 | |
| CN | 215734455 | U | | 2/2022 | |
| CN | 217116128 | U | | 8/2022 | |
| WO | 2020238517 | A1 | | 12/2020 | |
| WO | 2021068739 | A1 | | 4/2021 | |

* cited by examiner

300

200

23

200a

CAMERA DECORATION ASSEMBLY AND MOBILE TERMINAL DEVICE

CROSS-REFERENCE TO RELATED APPLICATIONS

This application is a U.S. National Stage of International Application No. PCT/CN2022/072388 filed on Jan. 17, 2022, which claims priority to Chinese Patent Application No. 202121329980.1, filed with the China National Intellectual Property Administration on Jun. 15, 2021, both of which are incorporated by reference in their entireties.

TECHNICAL FIELD

Embodiments of this application relate to the field of terminal technologies, and in particular, to a camera decoration assembly and a mobile terminal device.

BACKGROUND

A decoration member of a camera is exposed outside a device, and an appearance size of the decoration member located outside the device is generally limited by a size and a layout of an internal structure of the device. For example, a layout of a mobile terminal device 300 (for example, a mobile phone) is shown in FIG. 1. A housing 301 is a battery cover of the mobile phone, a main board area and a battery area are adjacent and sequentially arranged inside the housing 301, the main board area is close to a top of the housing 301, a camera 303 is electrically connected to a main board 305, a decoration member 307 is mounted from inside of the housing 301, and is exposed to outside of the device from the housing 301, and an appearance size Y of the decoration member 307 is limited by a size of the main board area and a position of the battery area. Specifically, the appearance size of the decoration member is Y=X-A-B-C. X is a distance from a battery 309 to the top of the housing 301, and a value of X mainly depends on a length of the main board 305; A is a minimum avoidance distance from the decoration member 307 to the battery 309, and A is set to prevent the decoration member 307 from hitting the battery 309 during falling of the mobile terminal device 300 or the like, to ensure the reliability of the battery 309; B is an effective sealing width between the decoration member 307 and the housing 301, and B is set to ensure the reliability of water and dust resistance of the mobile terminal device 300; and C is a minimum width allowed by the housing 301, and C is set to ensure that the housing 301 has certain processability and reliability. Therefore, the appearance size Y of the decoration member 307 is limited by the length of the main board 305 and a position size from the battery 309 to the top of the housing 301.

SUMMARY

In view of this, this application provides a camera decoration assembly not limited by a size and a layout of an internal structure of a device.

In a first aspect, this application provides a camera decoration assembly, including a decoration member, a mounting member and a fastener. The decoration member and the mounting member are connected through the fastener, and are respectively configured to be pressed on two opposite sides of a housing.

Obviously, in the foregoing design, the decoration member and the mounting member are mounted from outside and inside of the housing respectively to connect together, so that an appearance size of the decoration member located outside the housing is no longer limited by a size and a layout of an internal structure of a mobile terminal device.

In a possible design, the decoration member is of a metal structure; the mounting member includes a body and a conductor; and the conductor is of a metal structure, is embedded in the body, and is partially exposed from the body to be electrically connected to the decoration member and grounded.

Obviously, in the foregoing design, when the decoration member is metal, the conductor is grounded, thereby improving the use safety.

In a possible design, the body is of a plastic structure, the conductor is provided with a first hole, and the decoration member is provided with a threaded hole; and the fastener includes a pressing portion and a threaded portion arranged on one side of the pressing portion, the threaded portion passes through the first hole and is in threaded connection to the threaded hole, and the pressing portion is pressed on the conductor.

Obviously, in the foregoing design, the fastener connects the decoration member and the mounting member by being pressed on the conductor of the metal structure, thereby improving the strength of connecting the camera decoration assembly to the housing.

In a second aspect, this application provides a camera decoration assembly, including a decoration member and a mounting member. The mounting member includes a body and a conductor embedded in the body; the conductor is of a metal structure, and is partially exposed from the body to be electrically connected to the decoration member and grounded; and the decoration member and the mounting member are connected through buckling, and are respectively configured to be pressed on two opposite sides of a housing.

Obviously, in the foregoing design, the decoration member is mounted from outside of the housing; and the mounting member is mounted from inside of the housing, and is connected to the decoration member. An appearance size of the decoration member located outside the housing is not limited by a size and a layout of an internal structure of a mobile terminal device.

In a possible design, the body or the conductor is provided with a buckling hole, the decoration member is provided with a protruding buckling portion, and the buckling portion is in buckling connection to the buckling hole.

Obviously, in the foregoing design, the decoration member and the mounting member in the camera decoration assembly are connected through buckling, making it convenient to mount.

In a possible design, the conductor includes a first conduction portion and a second conduction portion; the body is provided with a second hole and a third hole, the first conduction portion is exposed from the second hole, and the second conduction portion is exposed from the third hole and is configured to be grounded; and the camera decoration assembly further includes an elastic sheet of a metal structure, and the elastic sheet is in contact with the first conduction portion and the decoration member.

Obviously, in the foregoing design, the elastic sheet is in elastic contact with the first conduction portion and the decoration member, thereby further improving the reliability of grounding of the decoration member.

In a possible design, the elastic sheet is located in the second hole, the decoration member is provided with a protruding connection guide portion, and the connection guide portion extends into the second hole and is pressed on the elastic sheet.

Obviously, in the foregoing design, the connection guide portion extends into the second hole and is pressed on the elastic sheet, so that the elastic sheet is in elastic contact with the connection guide portion, thereby improving the reliability of the elastic sheet in contact with the conductor and the decoration member.

In a possible design, the decoration member includes a first sub-decoration member and a second sub-decoration member; the second sub-decoration member is located between the first sub-decoration member and the housing, and the second sub-decoration member is provided with a fourth hole; and the first sub-decoration member is connected to the mounting member through the fourth hole, and is pressed on the second sub-decoration member.

Obviously, in the foregoing design, the first sub-decoration member and the second sub-decoration member in the decoration member form a step structure, providing different decoration effects. The first sub-decoration member is connected to the second sub-decoration member through the fastener or buckling, so that the second sub-decoration member and the mounting member are clamped on two sides of the housing.

In a possible design, the camera decoration assembly further includes a first sealing member and a second sealing member, the first sealing member is arranged between the first sub-decoration member and the mounting member, and the second sealing member is arranged between the mounting member and the housing.

Obviously, in the foregoing design, the camera decoration assembly is in sealed connection to the housing through the first sealing member and the second sealing member, thereby improving the reliability of water and dust resistance of the mobile terminal device.

In a third aspect, this application provides a mobile terminal device, including: a housing, a camera and the foregoing camera decoration assembly, where the camera is fixed inside the housing, and the camera decoration assembly is mounted on the housing and corresponds to the camera.

For the technical effects brought in the third aspect, refer to the related description of the camera decoration assembly involved in the first aspect and the second aspect, and details are not described herein again.

Figure 1:
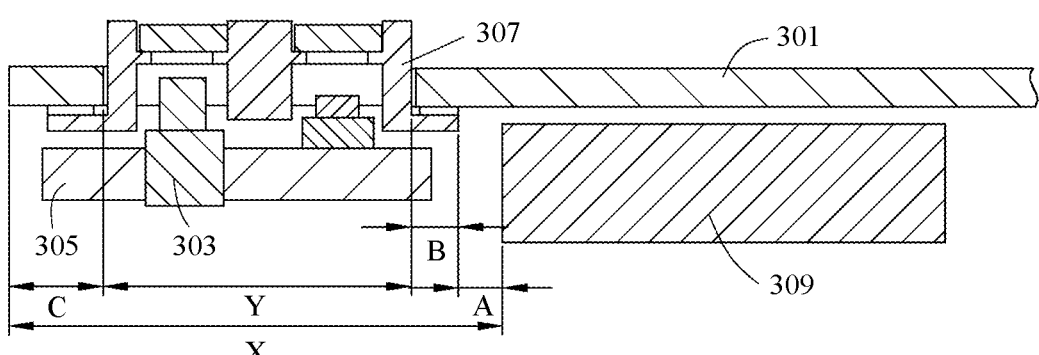
FIG. 1 is a schematic structural diagram of a mobile terminal device in the prior art.

LIST OF REFERENCE NUMERALS mobile terminal device: 200, 200*a*, and 300; housing: 201 and 301; camera: 203 and 303; main board: 205 and 305; battery: 209 and 309; camera decoration assembly: 100 and 100*a*; decoration member: 10, 10*a*, and 307; threaded hole: 101; protrusion portion: 103; fourth hole: 105; connection guide portion: 107; buckling portion: 109; connection portion: 1091; clamping portion: 1093; first sub-decoration member: 11 and 11*a*; second sub-decoration member: 13 and 13*a*; mounting member: 20 and 20*a*; body: 21 and 21*a*; second hole: 211; third hole: 213; buckling hole: 215; conductor: 23 and 23*a*; first hole: 231; first conduction portion: 233; second conduction portion: 235; conduction body: 237; fastener: 30; pressing portion: 31; threaded portion: 33; elastic sheet: 40; first contact portion: 41; second contact portion: 43; first sealing member: 50; second sealing member: 60; and lens: 70.

Description of Embodiments

To further explain technical means adopted in this application for achieving an intended application objective and effects, with reference to the accompanying drawings and embodiments, apparently, the described embodiments are only some embodiments rather than all the embodiments of this application.

Unless otherwise defined, meanings of all technical and scientific terms used in this specification are the same as those usually understood by a person skilled in the art to which this application belongs. In this application, terms used in the specification of this application are merely intended to describe objectives of specific embodiments, but are not intended to limit this application.

Some implementations of this application provide a camera decoration assembly. The camera decoration assembly includes a decoration member, a mounting member and a fastener. The decoration member and the mounting member are connected through the fastener, and are respectively configured to be pressed on two opposite sides of a housing. Alternatively, the camera decoration assembly includes a decoration member and a mounting member. The mounting member includes a body and a conductor embedded in the body. The conductor is of a metal structure, and is partially exposed from the body to be electrically connected to the decoration member and grounded. The decoration member and the mounting member are connected through buckling, and are respectively configured to be pressed on two opposite sides of a housing.

In the camera decoration assembly, the decoration member is mounted from outside of the housing, and the mounting member is mounted from inside of the housing, and is connected to the decoration member through the fastener or buckling. An appearance size of the decoration member located outside the housing is not limited by a size and a layout of an internal structure of a mobile terminal device.

Some implementations of this application are described below in detail with reference to the accompanying drawings. The following embodiments and features in the embodiments may be mutually combined in a case that no conflict occurs.

Figure 2:
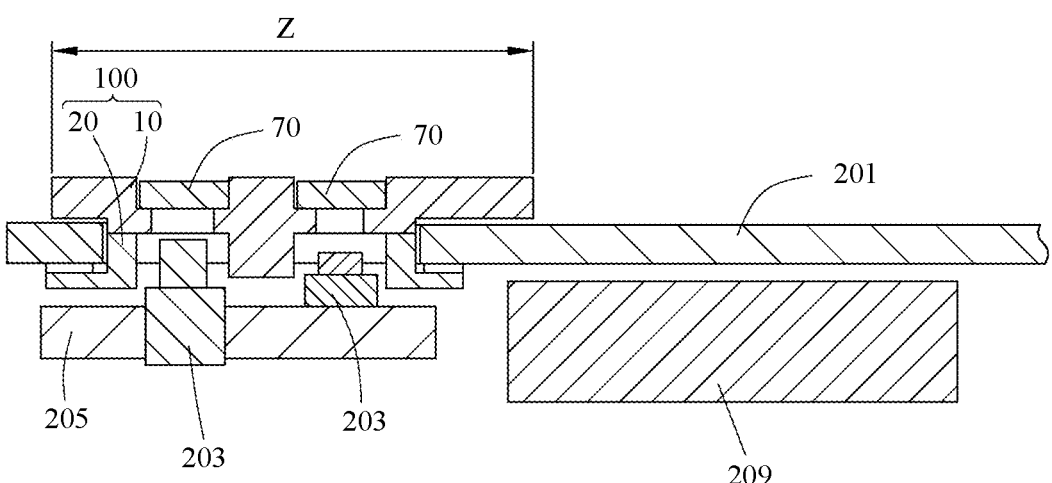
FIG. 2 is a schematic diagram of a cross-sectional structure of a mobile terminal device according to an embodiment of this application.

Referring to FIG. 2, an embodiment of this application provides a mobile terminal device 200. The mobile terminal device 200 includes a housing 201, a camera 203 and a camera decoration assembly 100. The camera 203 is fixedly mounted inside the housing 201. The camera decoration assembly 100 is mounted on the housing 201, corresponds to the camera 203, and is configured to decorate the camera 203. Specifically; the camera decoration assembly 100 includes a decoration member 10 and a mounting member 20. The decoration member 10 and the mounting member 20 are connected and pressed on two opposite sides of the housing 201 respectively. The decoration member 10 and the mounting member 20 are mounted from outside and inside of the housing 201 respectively to connect together. An appearance size Z of the decoration member 10 located outside the housing 201 is not limited by a size and a layout of an internal structure of the mobile terminal device 200.

It may be understood that, the mobile terminal device 200 includes, but is not limited to, a mobile phone, a tablet computer, a watch, a wearable device, or the like. The housing 201 may be of a housing structure such as a decoration housing or a battery cover of the mobile terminal device 200.

The mobile terminal device 200 further includes a main board 205 and a battery 209. The main board 205 and the battery 209 are adjacent and sequentially arranged inside the housing 201. The camera 203 and the camera decoration assembly 100 are arranged in the housing 201 close to the main board 205, and the camera 203 is electrically connected to the main board 205.

The decoration member 10 may be of a metal structure made of a metal material, may be of a plastic structure made of a plastic material, or may be of a composite structure made of a metal material and a plastic material. The mounting member 20 may be of a metal structure made of a metal material, may be of a plastic structure made of a plastic material, or may be of a composite structure made of a metal material and a plastic material. The decoration member 10 may extend out of the housing 201 to decorate the camera 203. A material of the decoration member 10 may be selected according to an appearance requirement of the mobile terminal device 200. The mounting member 20 is located inside the housing 201. To reduce the weight and cost of the mobile terminal device 200, the mounting member 20 may be set as the plastic structure. To improve the strength of the mounting member 20, the mounting member 20 may be set as the metal structure.

Referring to FIG. 2, the camera decoration assembly 100 further includes a lens 70. The lens 70 is mounted on one side of the decoration member 10 away from the housing 201. The camera 203 may perform shooting through the lens 70.

First Embodiment

Figure 3:
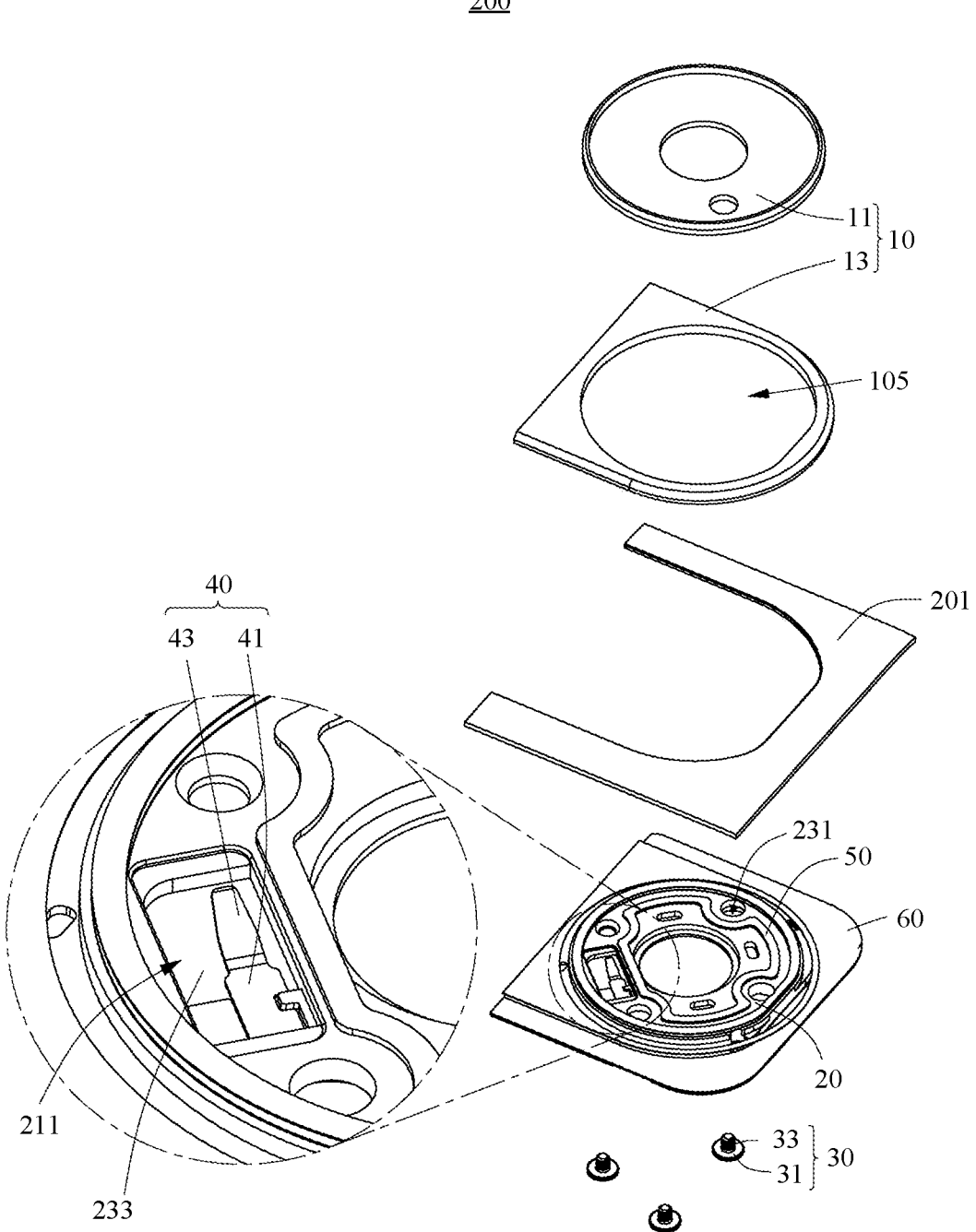
FIG. 3 is a schematic structural diagram of the mobile terminal device shown in FIG. 2 in which a camera and a lens are omitted in a first embodiment.
Figure 4:
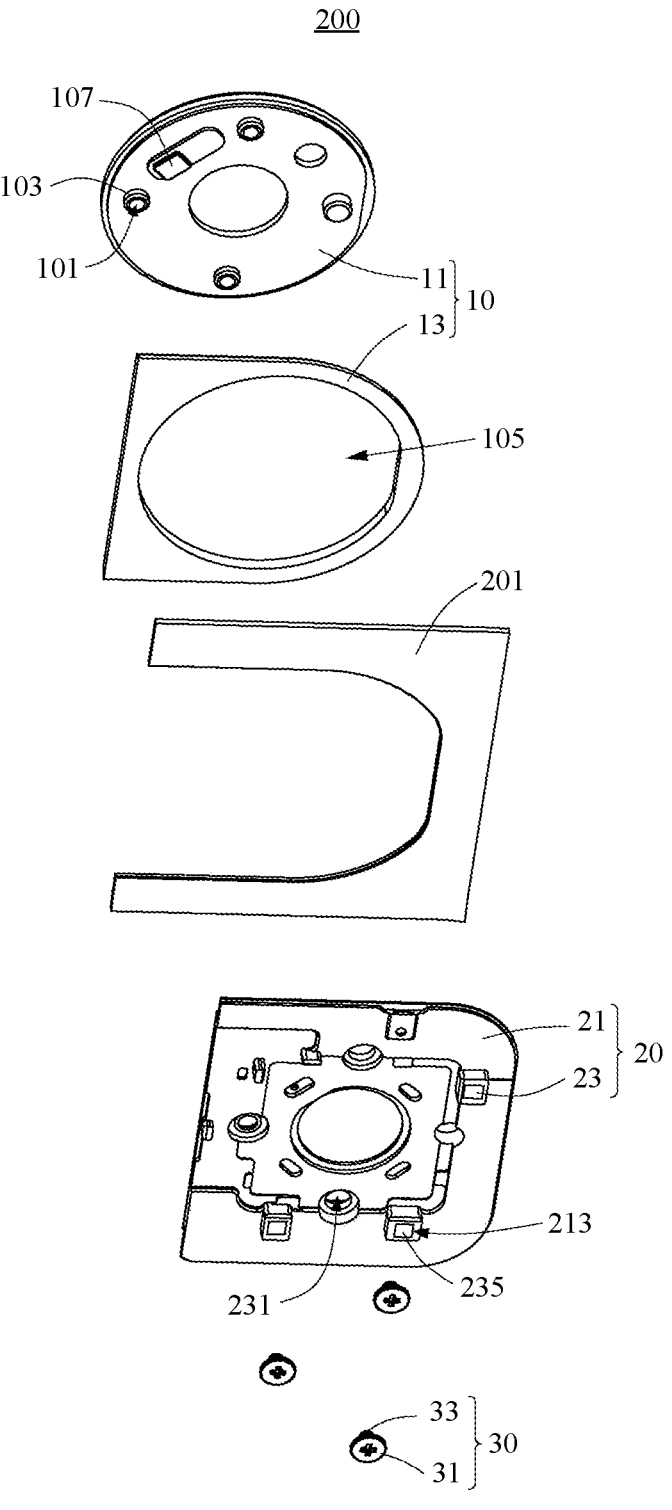
FIG. 4 is a schematic structural diagram of the mobile terminal device shown in FIG. 3 from another angle of view.

Referring to FIG. 3 and FIG. 4 together, the camera decoration assembly 100 further includes a fastener 30. The decoration member 10 and the mounting member 20 are connected through the fastener 30. The fastener 30 is located inside the housing 201. One end of the fastener 30 is connected to the decoration member 10 after passing through the mounting member 20, and the other end is pressed on the mounting member 20.

The decoration member 10 is mounted from outside of the housing 201, and the mounting member 20 is mounted from inside of the housing 201, and is connected to the decoration member 10. An appearance size of the decoration member 10 located outside the housing 201 is not limited by a size and a layout of an internal structure of the mobile terminal device 200.

The decoration member 10 and the mounting member 20 are connected through the fastener 30, making it easy to disassemble and assemble, and this structure is simple and is easy to manufacture.

Figure 5:
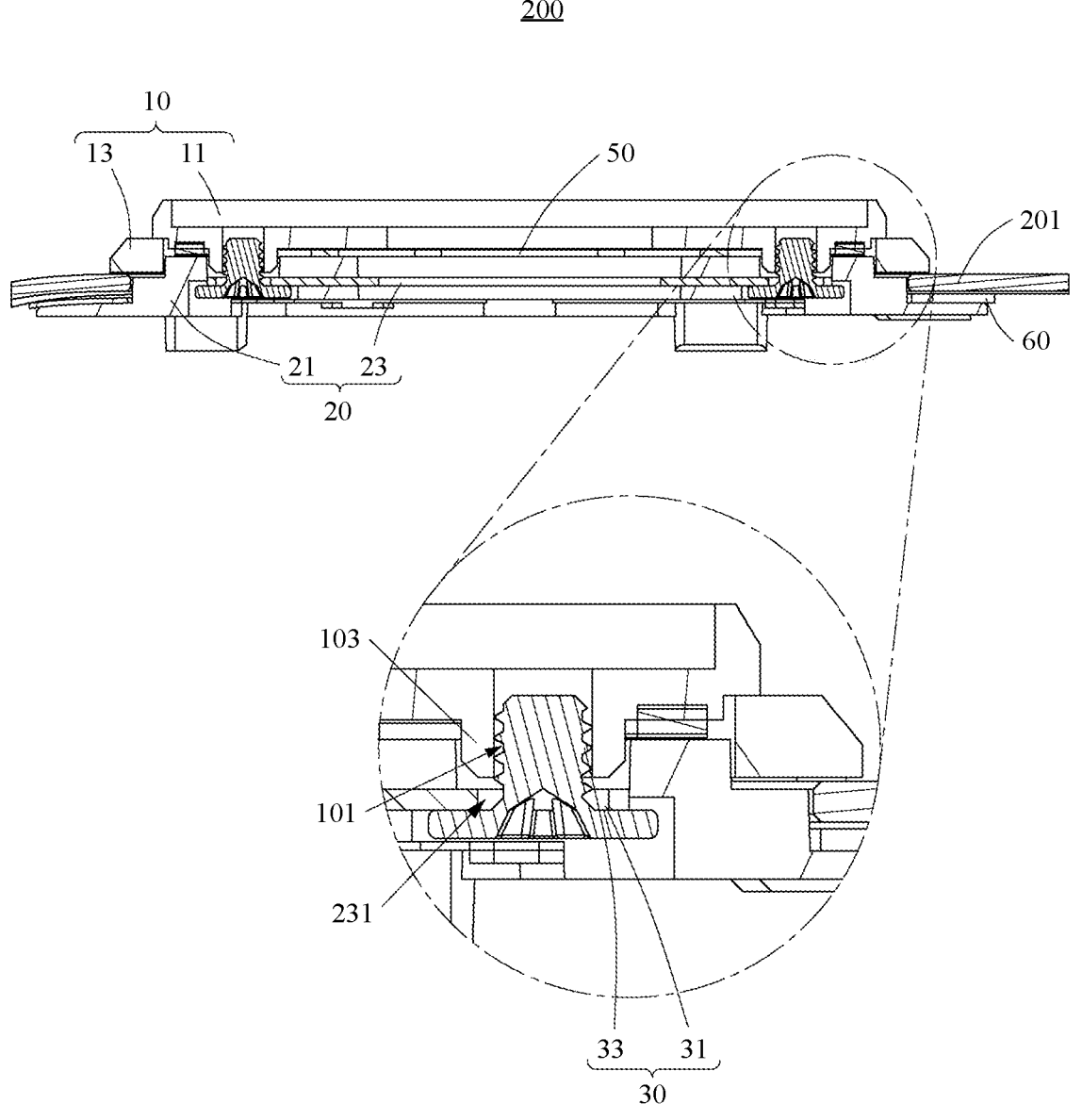
FIG. 5 is a schematic diagram of a cross-sectional structure of the mobile terminal device shown in FIG. 3.

Referring to FIG. 3 and FIG. 5 together, the decoration member 10 is of a metal structure. To ground the decoration member 10 to ensure the use safety of the mobile terminal device 200, the mounting member 20 includes a body 21 and a conductor 23. The body 21 is of a plastic structure made of a plastic material, and the conductor 23 is of a metal structure made of a metal material. The conductor 23 is embedded in the body 21. The mounting member 20 may be integrally formed by injection molding. The conductor 23 is partially exposed from the body 21 to be electrically connected to the decoration member 10 and grounded.

The mounting member 20 adopts the body 21 of the plastic material to reduce the weight, and adopts the conductor 23 of the metal material that is embedded in the body 21. The decoration member 10 is grounded by using the conductor 23, thereby improving the use safety.

Referring to FIG. 5, the conductor 23 is provided with a first hole 231. The decoration member 10 is provided with a threaded hole 101. As shown in FIG. 3, the fastener 30 includes a pressing portion 31 and a threaded portion 33 arranged on one side of the pressing portion 31. The threaded portion 33 passes through the first hole 231 and is in threaded connection to the threaded hole 101. The pressing portion 31 is pressed on the conductor 23. The fastener 30 may be of a structure such as a screw or a bolt.

The fastener 30 connects the decoration member 10 and the mounting member 20 by being pressed on the conductor 23 of the metal structure, thereby improving the strength of connecting the camera decoration assembly 100 to the housing 201.

There are three first holes 231, three threaded holes 101 and three fasteners 30, but this application is not limited thereto. It may be understood that in another embodiment, the numbers of the first holes 231, the threaded holes 101 and the fasteners 30 may also be one or other values.

It may be understood that in another embodiment, the threaded portion 33 of the fastener 30 may optionally be omitted, and a buckling structure connected to the decoration member 10 through buckling is provided.

It may be understood that in another embodiment, the fastener 30 may alternatively be connected to the decoration member 10 after passing through the body 21, and the pressing portion 31 of the fastener 30 is pressed on the body 21.

The body 21 is provided with a second hole 211 (as shown in FIG. 3) and a third hole 213 (as shown in FIG. 4). The conductor 23 includes a first conduction portion 233 (as shown in FIG. 3) and a second conduction portion 235 (as shown in FIG. 4). The first conduction portion 233 is exposed from the second hole 211 and is in contact with the decoration member 10 (as shown in FIG. 5). The second conduction portion 235 is exposed from the third hole 213 and is configured to be grounded.

Figure 6:
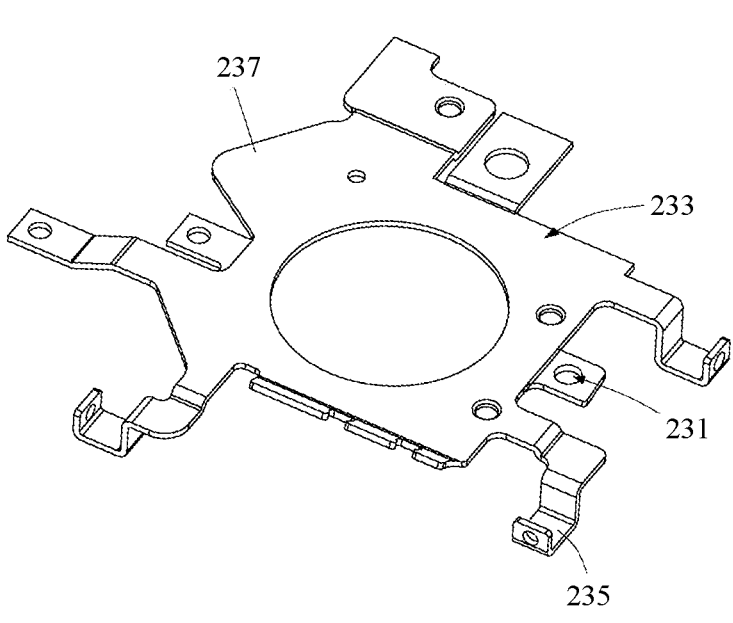
FIG. 6 is a schematic structural diagram of a conductor in the mobile terminal device shown in FIG. 3.

Specifically, referring to FIG. 6, the conductor 23 further includes a conduction body 237. The conduction body 237 is roughly of a metal sheet structure. The first conduction portion 233 is a surface of the conduction body 237 facing one side of the decoration member 10, and the second conduction portion 235 is of an L-shaped or U-shaped sheet structure formed by bending the conduction body 237 toward one side away from the decoration member 10. The second conduction portion 235 is grounded by surface contact.

It may be understood that in another embodiment, the second conduction portion 235 may alternatively be a surface of the conduction body 237 away from one side of the decoration member 10; or in another embodiment, the second conduction portion 235 may alternatively be of a spherical block structure protruding from the conduction body 237, and the second conduction portion 235 is grounded by point contact; or in still another embodiment, the second conduction portion 235 is of a planar sheet structure formed by bending the conduction body 237 toward one side away from the decoration member 10, and is grounded by using one end of the planar sheet structure.

It may be understood that in another embodiment, the body 21 and the conductor 23 may alternatively be two independent structures, and are connected together by bonding.

It may be understood that in another embodiment, the conductor 23 may optionally be omitted, the body 21 may alternatively be of a metal structure, the mounting member 20 is in contact with the decoration member 10, and the mounting member 20 is grounded to ensure that the decoration member 10 is grounded.

It may be understood that in another embodiment, the conductor 23 may optionally be omitted, the decoration member 10 is in contact with the housing 201, the housing 201 is set as a metal structure, and the housing 201 is grounded to implement grounding of the decoration member 10.

Referring to FIG. 3 and FIG. 4 together, to further improve the reliability of the grounding of the decoration member 10, the camera decoration assembly 100 further includes an elastic sheet 40 of a metal structure. The elastic sheet 40 is in contact with the conductor 23 and the decoration member 10. The elastic sheet 40 is located in the second hole 211. The decoration member 10 is provided with a protruding connection guide portion 107. The connection guide portion 107 extends into the second hole 211 and is pressed on the elastic sheet 40.

Referring to FIG. 3, the elastic sheet 40 includes a first contact portion 41 and a second contact portion 43 that are connected to each other. The first contact portion 41 is clamped and fastened to the body 21, and is in contact with the first conduction portion 233. The second contact portion 43 is bent by an angle relative to the first contact portion 41, and is inclined toward one side of the decoration member 10. The connection guide portion 107 of the decoration member 10 extends into the second hole 211, and presses the second contact portion 43 to elastically deform the second contact portion 43, so that the second contact portion 43 is in elastic contact with the connection guide portion 107, thereby improving the reliability of the elastic sheet 40 in contact with the conductor 23 and the decoration member 10 respectively. The decoration member 10, the elastic sheet 40, the first conduction portion 233 and the second conduction portion 235 are sequentially electrically connected and grounded.

It may be understood that in another embodiment, the connection guide portion 107 may optionally be omitted, provided that the elastic sheet 40 is in direct contact with a surface of the decoration member 10 facing the mounting member 20.

It may be understood that in another embodiment, the elastic sheet 40 may alternatively be a V-shaped, U-shaped, arc-shaped or another-shaped sheet structure, provided that the elastic sheet 40 is accommodated in the second hole 211, and may be in elastic contact with the first conduction portion 233 and the decoration member 10 respectively.

It may be understood that in another embodiment, the elastic sheet 40 may alternatively be welded on the conductor 23, or the elastic sheet 40 may alternatively be embedded in the body 21 and in contact with the conductor 23.

It may be understood that in another embodiment, the elastic sheet 40 may optionally be omitted, provided that the first conduction portion 233 of the conductor 23 is in direct contact with the connection guide portion 107.

It may be understood that in another embodiment, the elastic sheet 40 may optionally be omitted, and the first conduction portion 233 may alternatively not be in contact with the decoration member 10. Because the fastener 30 is pressed on the conductor 23, and the fastener 30 is connected to the decoration member 10, the fastener 30 is in contact with the conductor 23 and the decoration member 10. When the fastener 30 is made of a metal material, the conductor 23 and the decoration member 10 are electrically connected through the fastener 30.

Referring to FIG. 4 and FIG. 5, a protrusion portion 103 is arranged on one side of the decoration member 10 facing the mounting member 20. The threaded hole 101 is provided on the protrusion portion 103. The protrusion portion 103 may extend into the body 21, and is connected to the conductor 23 through the fastener 30, to reduce the overall thickness of the camera decoration assembly 100.

Referring to FIG. 3 and FIG. 5 together, the decoration member 10 includes a first sub-decoration member 11 and a second sub-decoration member 13. The second sub-decoration member 13 is located between the first sub-decoration member 11 and the housing 201. The second sub-decoration member 13 is provided with a fourth hole 105. The threaded hole 101 is provided on the first sub-decoration member 11. The first sub-decoration member 11 is connected to the mounting member 20 through the fourth hole 105, and is pressed on the second sub-decoration member 13, so that the second sub-decoration member 13 and the mounting member 20 are pressed on two opposite sides of the housing 201 respectively. The first sub-decoration member 11 is of a metal structure, and the second sub-decoration member 13 may be of a metal structure or a plastic structure. The first sub-decoration member 11 and the second sub-decoration member 13 form a step structure, so that the camera decoration assembly 100 of the camera 203 has a unique visual sense of beauty. It may be understood that in another embodiment, the second sub-decoration member 13 may optionally be omitted, and the first sub-decoration member 11 is in direct contact with the housing 201.

Referring to FIG. 3 and FIG. 5 together, the camera decoration assembly 100 further includes a first sealing member 50 and a second sealing member 60. The first sealing member 50 is arranged between the first sub-decoration member 11 and the mounting member 20. The second sealing member 60 is arranged between the mounting member 20 and the housing 201. The first sub-decoration member 11 is in sealed connection to the mounting member 20 by the first sealing member 50, the mounting member 20 is in sealed connection to the housing 201 by the second sealing member 60, so that the camera decoration assembly 100 is in sealed connection to the housing 201.

The camera decoration assembly 100 is in sealed connection to the housing 201 by the first sealing member 50 and the second sealing member 60, thereby improving the reliability of water and dust resistance of the mobile terminal device 200.

The first sealing member 50 is of a foam structure, and two opposite sides of the first sealing member 50 are in contact with or bonded to the first sub-decoration member 11 and the mounting member 20 respectively. The first sealing member 50 not only achieves sealing between the decoration member 10 and the mounting member 20, but also can be deformed to some extent, so that buffering is achieved between the decoration member 10 and the mounting member 20. The second sealing member 60 is an adhesive. The mounting member 20 and the housing 201 are bonded together by the second sealing member 60, thereby improving the reliability of sealing.

Second Embodiment

A structure of a mobile terminal device 200a in the second embodiment is roughly the same as that of the mobile terminal device 200 in the first embodiment, and a difference lies in that a connection solution of a decoration member 10a and a mounting member 20a in a camera decoration assembly 100a in the second embodiment is different from a connection solution of the decoration member 10 and the mounting member 20 in the camera decoration assembly 100 in the first embodiment. The decoration member 10a and the mounting member 20a are connected through buckling.

Figure 7:
FIG. 7 is a schematic structural diagram of the mobile terminal device shown in FIG. 2 in which a camera and a lens are omitted in a second embodiment.
Figure 8:
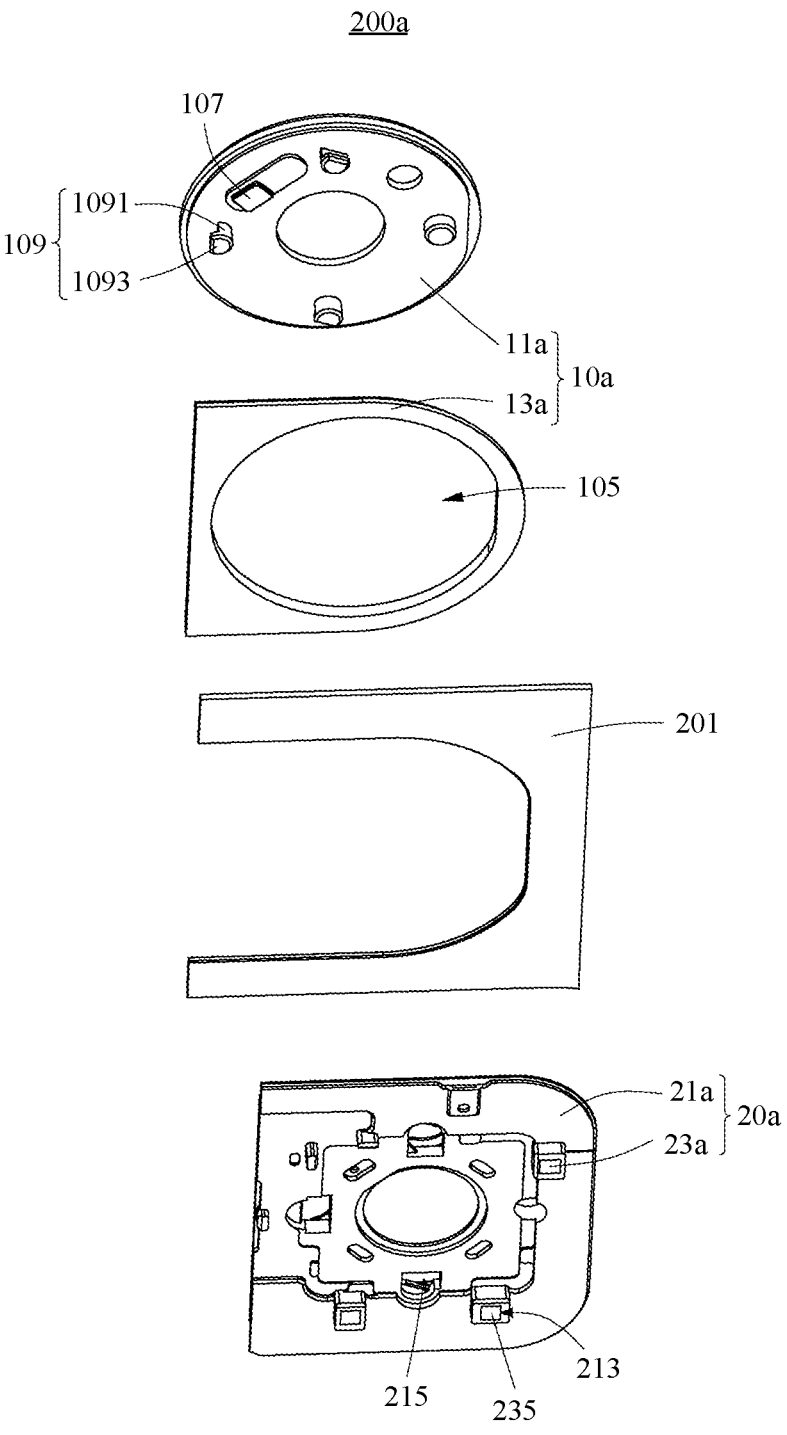
FIG. 8 is a schematic structural diagram of the mobile terminal device shown in FIG. 7 from another angle of view.
Figure 9:
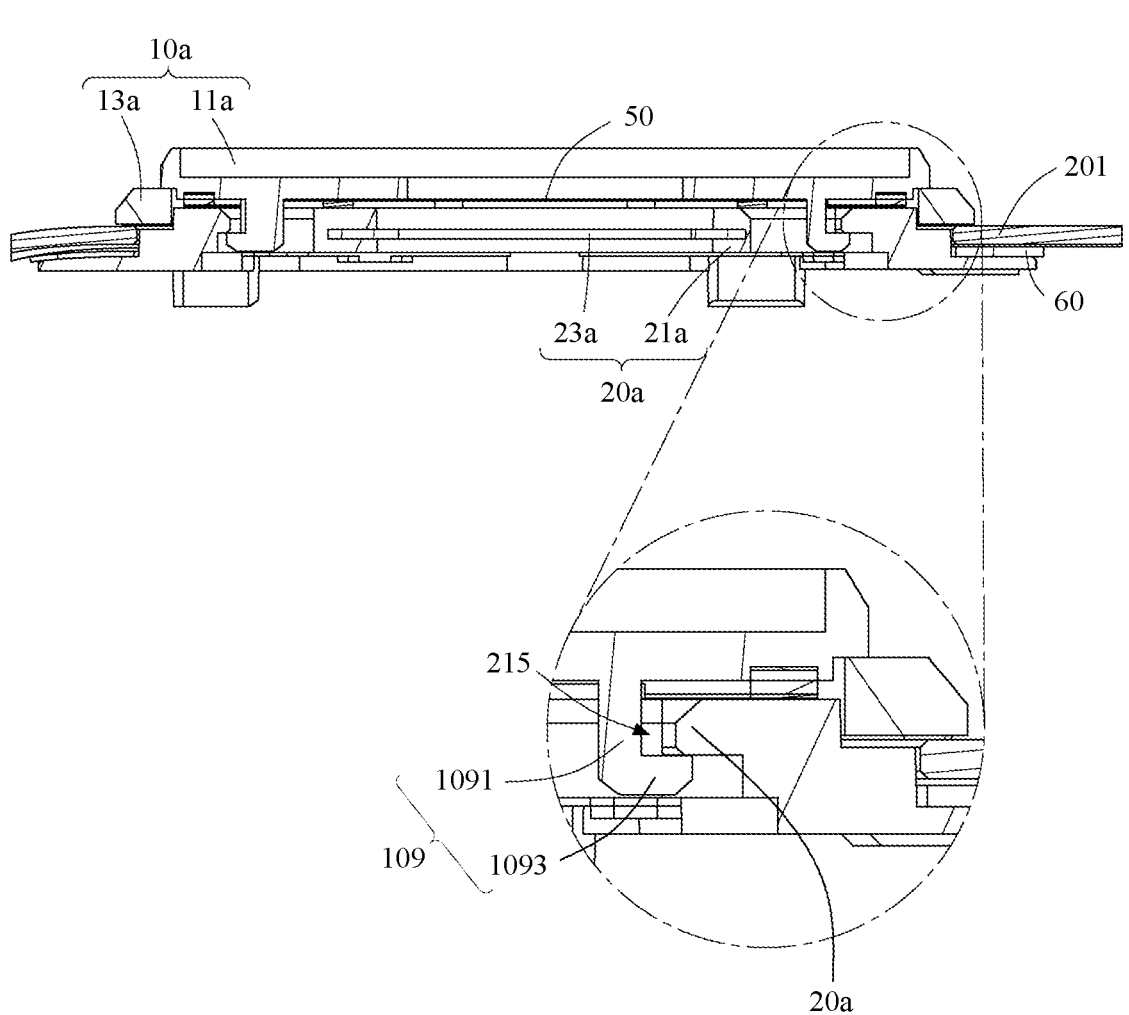
FIG. 9 is a schematic diagram of a cross-sectional structure of the mobile terminal device shown in FIG. 7.

Referring to FIG. 7 to FIG. 9 together, the camera decoration assembly 100a does not include any fastener 30 of the camera decoration assembly 100, the decoration member 10a does not include any threaded hole 101, and the mounting member 20a does not include any first hole 231. The mounting member 20a includes a body 21a and a conductor 23a. The decoration member 10a and the body 21a are connected through buckling, and are pressed on two opposite sides of the housing 201 respectively.

Specifically; the body 21a of the mounting member 20a is provided with a buckling hole 215. A first sub-decoration member 11a facing the mounting member 20a is provided with a protruding buckling portion 109. The buckling portion 109 is in buckling connection to the buckling hole 215. Specifically, the buckling portion 109 includes a connection portion 1091 and a clamping portion 1093. A surface of the first sub-decoration member 11a facing the mounting member 20a partially extends to form the connection portion 1091. The clamping portion 1093 is arranged on the connection portion 1091 and extends toward one side of the connection portion 1091. In a process that the first sub-decoration member 11a moves toward the mounting member 20a, the clamping portion 1093 is pressed to drive the connection portion 1091 to deform, so that the clamping portion 1093 passes through the buckling hole 215, the connection portion 1091 is then restored to the original shape, the clamping portion 1093 is clamped on one side of the body 21 on a peripheral side of the buckling hole 215 away from the first sub-decoration member 11a, and the body 21a and the first sub-decoration member 11a are relatively fixed through the buckling connection between the buckling portion 109 and the buckling hole 215.

The decoration member 10a is grounded by using the elastic sheet 40 and the conductor 23a.

It may be understood that in another embodiment, the elastic sheet 40 may optionally be omitted. The buckling hole 215 may be provided on the conductor 23a, and the buckling portion 109 is in buckling connection to the buckling hole 215, so that the first sub-decoration member 11a is in contact with the conductor 23a, thereby implementing the grounding of the decoration member 10a.

It may be understood that in another embodiment, the second sub-decoration member 13a may be omitted, or the second sub-decoration member 13a and the first sub-decoration member 11a may be of an integral structure.

The decoration member 10a is mounted from outside of the housing 201. The mounting member 20a is mounted from inside of the housing 201, and is connected to the decoration member 10a. An appearance size of the decoration member 10a located outside the housing 201 is not limited by a size and a layout of an internal structure of the mobile terminal device 200.

The decoration member 10a and the mounting member 20a in the camera decoration assembly 100a are connected through buckling, making it convenient to mount.

In the camera decoration assembly 100 and the mobile terminal device 200, the decoration member 10 and the mounting member 20 are mounted from outside and inside of the housing 201 respectively to connect together, so that an appearance size of the decoration member 10 located outside the housing 201 is no longer limited by a size and a layout of an internal structure of the mobile terminal device 200.

The foregoing embodiments are only intended for describing the technical solutions of this application but not for limiting this application. Although this application is described in detail with reference to the preferred embodiments, a person of ordinary skill in the art should understand that modifications or equivalent replacements can be made to the technical solutions of this application without departing from the spirit and essence of the technical solutions of this application.

What is claimed is:

1. A camera decoration assembly, comprising:
   a decoration member of a metal structure, comprising:
     a first sub-decoration member; and
     a second sub-decoration member having a hole;
   a mounting member with a metal component, wherein the metal component of the mounting member is in contact with the decoration member; and
   a fastener, wherein the decoration member and the mounting member are fixedly connected through the fastener by connecting the first sub-decoration member to the mounting member through the hole via buckling.

2. The camera decoration assembly of claim 1, wherein the metal structure is a first metal structure, and wherein the mounting member is of a second metal structure.

3. The camera decoration assembly of claim 2, wherein the decoration member and the mounting member are respectively configured to be pressed on two opposite sides of a housing.

4. The camera decoration assembly of claim 3, wherein the second sub-decoration member is located between the first sub-decoration member and the housing, and wherein the first sub-decoration member is pressed on the second sub-decoration member.

5. The camera decoration assembly of claim 1, wherein the mounting member further comprises a body, wherein the metal component of the mounting member is a conductor embedded in the body, and wherein the conductor is partially exposed from the body, is electrically connected to the decoration member, and is grounded.

6. The camera decoration assembly of claim 5, wherein the body is of a plastic structure, wherein the conductor includes a first hole, wherein the decoration member includes a threaded hole, wherein the fastener comprises a pressing portion and a threaded portion arranged on one side of the pressing portion, wherein the threaded portion passes through the first hole and is in threaded connection to the threaded hole, and wherein the pressing portion is pressed on the conductor.

7. The camera decoration assembly of claim 6, wherein the metal structure is a first metal structure, wherein the conductor comprises a first conduction portion and a second conduction portion, wherein the body comprises a second hole and a third hole, wherein the first conduction portion is exposed from the second hole, wherein the second conduction portion is exposed from the third hole and is configured to be grounded, wherein the camera decoration assembly further comprises an elastic sheet of a second metal structure, and wherein the elastic sheet is in contact with the first conduction portion and the decoration member.

8. The camera decoration assembly of claim 7, wherein the elastic sheet is located in the second hole, wherein the decoration member comprises a protruding connection guide portion and wherein the connection guide portion extends into the second hole and is pressed on the elastic sheet.

9. The camera decoration assembly of claim 5, wherein the body comprises a buckling hole, wherein the decoration member comprises a protruding buckling portion, and wherein the protruding buckling portion is in buckling connection to the buckling hole.

10. The camera decoration assembly of claim 9, wherein the protruding buckling portion comprises a connection portion and a clamping portion, wherein a surface of the first sub-decoration member facing the mounting member partially extends to form the connection portion, and wherein the clamping portion is arranged on the connection portion and extends toward one side of the connection portion.

11. The camera decoration assembly of claim 5, wherein the metal structure is a first metal structure, wherein the conductor comprises a first conduction portion and a second conduction portion, wherein the body comprises a second hole and a third hole, wherein the first conduction portion is exposed from the second hole, wherein the second conduction portion is exposed from the third hole and is configured to be grounded, wherein the camera decoration assembly further comprises an elastic sheet of a second metal structure, and wherein the elastic sheet is in contact with the first conduction portion and the decoration member.

12. The camera decoration assembly of claim 11, wherein the elastic sheet is located in the second hole, wherein the decoration member comprises a protruding connection guide portion, and wherein the connection guide portion extends into the second hole and is pressed on the elastic sheet.

13. The camera decoration assembly of claim 1, wherein the decoration member and the mounting member are respectively configured to be pressed on two opposite sides of a housing.

14. The camera decoration assembly of claim 13, wherein the second sub-decoration member is located between the first sub-decoration member and the housing, and wherein the first sub-decoration member is pressed on the second sub-decoration member.

15. The camera decoration assembly of claim 14, further comprising:
a first sealing member between the first sub-decoration member and the mounting member; and
a second sealing member arranged between the mounting member and the housing.

16. The camera decoration assembly of claim 1, wherein the fastener is a screw.

17. A mobile terminal device, comprising:
a housing;
a camera fixed inside the housing; and
a camera decoration assembly mounted on the housing and corresponding to the camera, the camera decoration assembly comprising:
a decoration member of a metal structure, comprising:
a first sub-decoration member; and
a second sub-decoration member having a hole;
a mounting member with a metal component, wherein the metal component of the mounting member is in contact with the decoration member; and
a fastener, wherein the decoration member and the mounting member are fixedly connected through the fastener by connecting the first sub-decoration member to the mounting member through the hole via buckling.

18. The mobile terminal device of claim 17, wherein the metal structure is a first metal structure, and wherein the mounting member is of a second metal structure.

19. The mobile terminal device of claim 17, wherein the decoration member and the mounting member are respectively configured to be pressed on two opposite sides of a housing.

20. A mobile terminal device, comprising:
a housing;
a camera fixed inside the housing; and
a camera decoration assembly mounted on the housing and corresponding to the camera, the camera decoration assembly comprising:
a decoration member of a metal structure, comprising:
a first sub-decoration member; and
a second sub-decoration member having a hole;
a mounting member comprising body and a metal component, wherein the metal component of the mounting member is in contact with the decoration member, wherein the metal component of the mounting member is a conductor embedded in the body, wherein the conductor is partially exposed from the body, is electrically connected to the decoration member, and is grounded; and
a fastener, wherein the decoration member and the mounting member are fixedly connected through the fastener by connecting the first sub-decoration member to the mounting member through the hole via buckling.

* * * * *